Figure 1:
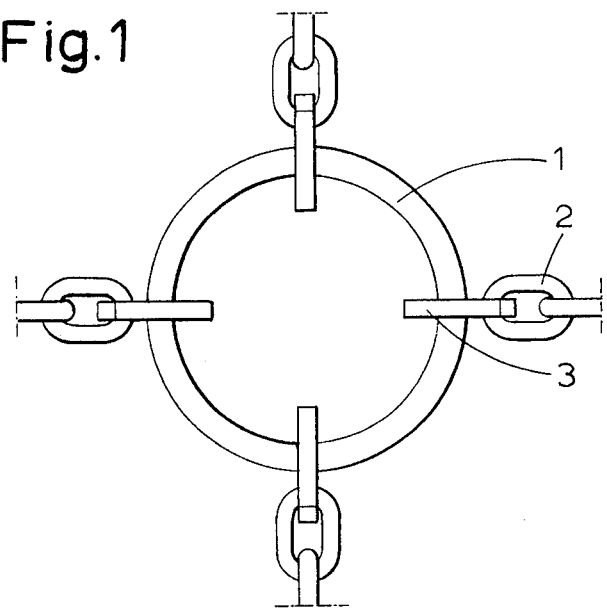

United States Patent [19]

Daniel

[11] 4,020,886
[45] May 3, 1977

[54] TIRE CHAIN FOR TRACTORS AND THE LIKE

[75] Inventor: Gordon Daniel, Mandal, Norway

[73] Assignee: Norsk Kjettingindustri A-S Alf Nosted, Mandal, Norway

[22] Filed: Nov. 10, 1975

[21] Appl. No.: 630,614

[30] Foreign Application Priority Data

Nov. 8, 1974 Norway .............................. 744032

[52] U.S. Cl. .............................. 152/243; 152/232; 152/241
[51] Int. Cl.² ............................................ B60C 27/20
[58] Field of Search .......... 152/213 R, 213 A, 231, 152/232, 241–244, 222–230, 233; 59/1, 3, 35, 93

[56] References Cited

UNITED STATES PATENTS

| 1,364,454 | 1/1921 | Ross ................................ 152/239 |
| 1,670,528 | 5/1928 | Carpenter ......................... 152/243 |
| 1,917,161 | 7/1933 | Smith ............................... 152/239 |
| 3,382,906 | 5/1968 | Müller et al. ..................... 152/243 |
| 3,490,228 | 1/1970 | Gower ............................... 152/244 |
| 3,490,511 | 1/1970 | Müller et al. ..................... 152/243 |

*Primary Examiner*—Drayton E. Hoffman
*Attorney, Agent, or Firm*—Wenderoth, Lind & Ponack

[57] ABSTRACT

A tire chain for tractors and the like includes a plurality of relatively large longitudinally aligned annular elements which are retained in the chain by means of laterally extending chain parts, and onto which are welded a number of plate members protruding in radial planes normal to the general plane of the annular element. The plate members serve both as claw means for the chain and as means for connecting the lateral chain parts of the annular elements.

4 Claims, 3 Drawing Figures

TIRE CHAIN FOR TRACTORS AND THE LIKE

BACKGROUND OF THE INVENTION

This invention relates to a tire chain, such as for tractors or other automotive working machines.

More specifically the invention relates to a tire chain of the type comprising a plurality of relatively large, longitudinally aligned annular chain links or elements, which are retained in the chain by means of laterally extending chain parts, and onto which are welded a number of plate members protruding normal to the general plane of the annular chain element and serving as claw means for the chain, and a corresponding number of eye means for connecting the end links of the lateral chain parts to the annular elements.

The plate members or claw means of conventional chains of this type are oriented in planes which are substantially tangential to the circumferencial axis of the annular element, and the eye means are welded to the outer periphery of the annular elements at an angle adjusted to the inclination of the side of the tire for which the chain is intended. Thus, to assemble the claw means and eye means to the annular elements two separate welding operations, with associated clamping and releasing in separate jigs, are required.

SUMMARY OF THE INVENTION

An object of the present invention is to provide a tire chain of the type described above, but which is cheaper and simpler in production.

Another object is to provide a chain in which the end link of the lateral parts fits snugly to the surface of the tire.

This is achieved by welding the plate members to the annular element in radial planes, each plate member in a base portion thereof having a recess in which the adjacent portion of the annular element and the end link of the lateral part are accomodated.

This arrangement implies that the claw means and the eye means are formed in pairs as an integral element, such that only one clamping and welding operation is required. In this arrangement the end link of the lateral part will be located in close and substantially parallel relationship to the surface of the tire.

BRIEF DESCRIPTION OF THE INVENTION

Figure 2:
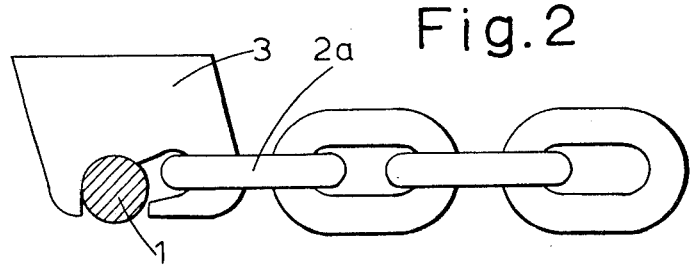
Figure 3:
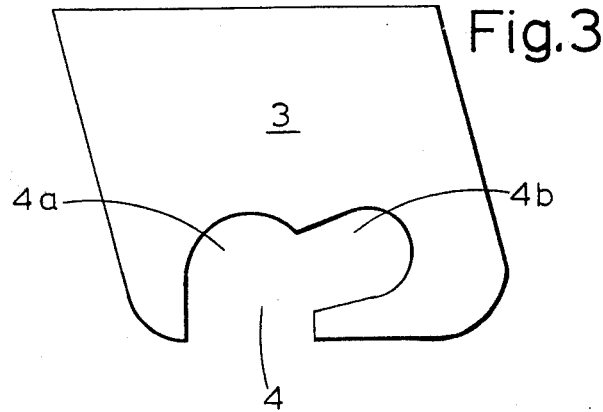

An embodiment of the invention will now be described by way of example and with reference to the accompanying drawing, in which:

FIG. 1 is a plan view of an annular element in a tire chain according to the invention, showing the end sections of the associated lateral chain parts, FIG. 2 is an enlarged view of a cross section through the annular element of FIG. 1 near an associated lateral link, and FIG. 3 shows a detail of the plate member according to the invention.

The tire chain according to the invention comprises a plurality of identical, relatively large annular elements or steel rings 1 of circular cross section, one of which is shown in FIG. 1. The annular elements 1 are preferably aligned in spaced relationship along the longitudinal axis of the chain and they are connected to one another and/or to the side parts (not shown) of the chain by means of lateral chain parts 2. Radially on the ring 1 and in a spaced relationship are welded four plate members 3 which according to the invention serve both as claw means to give the chain good gripping properties, and as eye means for connecting the lateral chain parts 2 to the ring elements 1.

The plate member 3 is shown in detail in FIG. 3. It is made from special steel, and in the embodiment shown it is substantially rectangular, but may have any suitable shape such as trapezoidal or elliptical. The base portion of the member 3, i.e., the edge portion to be welded to the ring 1, is provided with a bifurcated recess 4, one furcation 4a being defined by a circular arc corresponding to the cross sectional form of the annular element 1 and the other furcation 4b in its bottom being defined by a circular arc having a somewhat larger radius than the cross sectional radius of the end link 2a of the lateral part 2. The plate members 3 with recess 4 are preferably formed by punching from plate material.

When assembling the above described elements, members and parts of the chain, the end link 2a of the chain part 2 is inserted in the recess 4b in the plate member 3. Then the plate member 3 is placed radially over the annular element 1, with the latter being received in the recess 4a in the plate element, as shown in FIG. 2. Finally the plate member 3 is welded to the annular element 1 on both sides of the plate element along the contact surface between the plate member and annular element. The end link 2a of the lateral part 2 is now moveably confined in the recess 4b of the plate member, the annular element 1 in the recess 4a closing the opening of the recess 4b. To complete the chain a selected number of such ring assemblies are connected to the side parts (not shown) in a conventional manner.

I claim:
1. A tire chain comprising:
a plurality of longitudinally aligned annular elements;
each said annular element having rigidly fixed thereto a plurality of plate members extending radially of said annular element in planes perpendicular to the general plane of said annular element;
each said plate member having an edge portion with a bifurcated recess therein, said recess including first and second furcations;
said annular elements being joined by chain lengths, each said chain length having end links loosely positioned within first furcations of respective of said plate members; and
each said plate member receiving in the second furcation thereof the respective said annular element, said annular element being rigidly fixed to said plate member within said second furcation and blocking removal of the respective end link from the respective said first furcation.
2. A tire chain as claimed in claim 1, wherein each said annular element has a circular transverse cross-sectional configuration.
3. A tire chain as claimed in claim 2, wherein each said second furcation is defined by a circular arc corresponding to said cross-sectional configuration of the respective said annular element.
4. A tire chain as claimed in claim 1, wherein said annular elements are welded to the respective said plate members within the respective said second furcations thereof.

* * * * *